3,476,723
PROCESS FOR THE PEROXIDIC CURING OF A MONOMER-POLYMER SYRUPY SOLUTION CONTAINING A POLYMER OF METHYLMETHACRYLATE OR A COPOLYMER THEREOF WITH UP TO ABOUT 20% OF ANOTHER LOWER ALKYLMETHACRYLATE
Dieter Stahl, Emmerich (Rhine), Germany, and Otto Karel Strolenberg, 's Heerenberg, and Leonardus W. J. Damen, Deventer, Netherlands, assignors to Koninklijke Industrieele Maatschappij Noury & van der Lande N.V.
No Drawing. Filed July 18, 1966, Ser. No. 565,675
Claims priority, application Great Britain, July 23, 1965, 31,554/65
Int. Cl. C08f 1/66, 1/72, 29/46
U.S. Cl. 260—86.1         9 Claims

ABSTRACT OF THE DISCLOSURE

A process is disclosed herein for the peroxidic curing, at a temperature in the range of 0° to 60° C., of a monomer-polymer syrupy solution containing a polymer of methylmethacrylate or a copolymer of methylmethacrylate with another lower alkylmethacrylate, using a curing system comprising
(a) a free radical-generating organic peroxide;
(b) a vanadium accelerator; and
(c) an aliphatic aldehyde containing 1–18 carbon atoms in the molecule;
all components of the curing system being soluble in the monomeric lower alkylmethacrylate, the free-radical generating organic peroxide being present in an amount sufficient to effect curing, the vanadium accelerator and aliphatic aldehyde being present in an amount in the range of, respectively, 0.0001–0.01% by weight calculated on metal and 1–4% by weight calculated on the total resin solution.

---

The present invention relates to a novel process for the peroxidic curing, at a temperature in the range of 0° to 60° C., of solutions of homopolymers or copolymers of methylmethacrylate in monomeric methylmethacrylate, using a new curing system; and it also relates to methylmethacrylate polymers prepared by the process.

Solutions of homopolymers or copolymers of methylmethacrylate in monomeric methylmethacrylate are prepared by heating methylmethacrylate with a small amount of a peroxidic initiator, e.g. benzoyl peroxide or lauroyl peroxide, to obtain a product having a syrupy consistency, or by dissolving a prepolymer in methylmethacrylate.

These solutions may be cured at a temperature from 0° to 60° C. with the aid of benzoyl peroxide which acts as a peroxidic initiator, and the presence of a tertiary amine which serves as an accelerator for the benzoyl peroxide. The finished polymers, however, have the drawback that they become discolored by sunlight.

It is also possible to cure these solutions in the same temperature range with the aid of an initiator-accelerator system consisting of mono-tertiary butyl permaleate and either cadmium or zinc mercaptide. This method of curing has the drawback, however, that mono-tertiary butyl permaleate is the only applicable peroxide in this system, so that only a limited variation in the working method is possible. Moreover, this curing system is not applicable to use in thin layers and furthermore it is sensitive to air-inhibition. During curing with the aid of this system, any surface exposed to the air remains tacky.

It has now been found that solutions of homopolymers or copolymers of methylmethacrylate in monomeric methylmethacrylate may be cured into colorless products which do not discolor in sunlight by using a curing system based upon vanadium compound.

According to the present invention, a process is provided for the peroxidic curing of a solution of a homopolymer or copolymer of methylmethacrylate in monomeric methylmethacrylate, which comprises curing the solution at a temperature in the range of 0° to 60° C. after compounding with a curing system comprising:
(1) a free-radical-generating organic peroxide;
(2) a vanadium accelerator; and
(3) an aliphatic aldehyde containing 1–18 carbon atoms in the molecule;

all components of the curing system being soluble in the monomeric methylmethacrylate.

The curing system according to the present invention has the further advantages of being insensitve to air-inhibition and of being usable for the production of thin well-cured layers, the surface of which remains tack-free during curing.

Free-radical-generating organic peroxides which are useful in the system according to the present invention include hydro-peroxides, e.g. tertiary butyl hydroperoxide and cumene hydroperoxide; ketone peroxides, e.g. cyclohexanone peroxide and methylethyl ketone peroxide; diacyl peroxides, e.g. benzoyl peroxide; peresters, e.g. tertiary butyl perhexoate and tertiary butyl perbenzoate; and perketals, e.g. 2,2-bis(tert.butylperoxy)-butane.

The vanadium accelerator can be selected from a wide range of inorganic, organic or complex vanadium compounds in combination with a liquid aliphatic mono- or diester of phosphoric or phosphorous acid or a liquid aliphatic or aromatic sulphuric acid. The aliphatic mono- or diesters of phosphoric or phosphorous acid are preferably selected from the methyl, ethyl, propyl, butyl, amyl, hexyl, heptyl and octyl esters and their isomers. The aliphatic or aromatic sulphonic acid is preferably a toluene, xylene or other alkylated benzene sulphonic acid, e.g. paratoluene-sulphonic acid.

The quantity of the vanadium accelerator used for decomposing the organic peroxide into free radicals may vary in the range of 0.0001–0.01 percent by weight calculated as metal based on the total resin solution, preferably being 0.001–0.01 percent by weight.

The aliphatic aldehyde preferably contains 4–8 carbon atoms in the molecule. The amount employed is preferably 1–4% by weight calculated on the total resin solution.

Curing of the solutions of polymethylmethacrylate in methylmethacrylate takes place under otherwise conventional conditions.

In order that the present invention may be still more readily understood, the following working examples are given by way of illustration and not as limiting the invention:

Example 1

A commercial syrupy solution of polymethylmethacrylate in monomeric methylmethacrylate, Plexit 51 (R.T.M.) (viscosity 59 poises, refractive index at 20° C. 1.4478, acid number nil), was compounded with 0.5% by weight of cyclohexanone peroxide, 2% by weight of butyraldehyde, and 1% by weight of a vanadium accelerator.

The accelerator was prepared by dissolving $V_2O_5$, with heating, in monobutyl dihydrophosphate in such an amount that a solution containing 0.2% by weight of vanadium, calculated as metal, was obtained.

After 1 hour of curing at a temperature of 20° C., the composition was polymerized to such an extent that it could be easily handled. After curing at the same temperature for 24 hours, a completely cured colorless polymer was obtained.

Example 2

A solution was prepared by heating methylmethacrylate at a temperature of 80° C., in the presence of 0.1% by weight of benzoyl peroxide for a time sufficient to obtain a solution having a syrupy consistency.

This solution was compounded with 1% by weight of a benzoyl peroxide paste (50%), 6% by weight of heptanal, and 1% by weight of a vanadium accelerator.

The accelerator was prepared by dissolving $BCl_5$ with heating in dibutyl hydrophosphite in such an amount that a solution containing 0.2% by weight of vanadium, calculated as metal, was obtained.

After compounding, the composition was poured out into thin layers 1 mm. in thickness. After 15 minutes, gelling started. After 1 hour of curing at a temperature of 20° C., the composition was polymerized to such an extent that it could be easily handled. After curing at the same temperature for 24 hours, completely cured layers were obtained which remained colorless and tack-free.

Example 3

A commercial syrupy solution of polymethylmethacrylate in monomeric methyl methacrylate, Plexit 51 (R.T.M.), was compounded with 1% by weight of cumene hydroperoxide (75%), 1% by weight of a vanadium accelerator containing 0.2% by weight of vanadium, and 2% by weight of isobutyraldehyde.

The vanadium accelerator was prepared in the same way as that described above in Example 1, except that the $V_2O_5$ was replaced by vanadium naphthenate.

After compounding, the composition was poured out into thin layers 1 mm. in thickness. After 10 minutes, gelling started. After 1 hour of curing at a temperature of 20° C., the composition was polymerized to such an extent that it could be easily handled. After curing at the same temperature for 24 hours, completely cured films wer obtained. When exposed to the air, the films remained colorless and tack-free.

Example 4

A commercial syrupy solution of polymethylmethacrylate in monomeric methyl methacrylate, Plexit 51 (R.T.M.), was compounded with 1% by weight of tertiary butyl perbenzoate, 1% by weight of a vanadium accelerator containing 0.2% by weight of vanadium, and 4% by weight of octanal.

The vanadium accelerator was prepared by dissolving $V_2O_5$ with heating in a mixture of dibutyl hydrophosphate and dibutyl phthalate in such an amount that a solution containing 0.2% by weight of vanadium, calculated as metal, was obtained.

After compounding, the composition was poured out into thin films 1 mm. in thickness. After 35 minutes, gelling started. After 2 hours of curing at a temperature of 20° C., a polymer was obtained which could easily be handled. Completely cured, tack-free films which remained colorless were obtained after 24 hours of curing at the same temperature.

Example 5

A solution was prepared by heating a mixture of methylmethacrylate and butylmethacrylate (weight ratio 9:1) at a temperature of 80° C. in the presence of 0.1% by weight of benzoyl peroxide, for a time sufficient to obtain a solution having a syrupy consistency.

This solution was then compounded with 2% by weight of a 50% by weight solution of 2,2(bis tert.butylperoxy)-butane in dibutylphthalate, 6% by weight of octadecadienal, and 0.5% by weight of a vanadium accelerator.

The accelerator was prepared by dissolving $V_2O_5$ in para-toluene-sulphonic acid in such an amount that a solution containing 0.4% by weight of vanadium, calculated as metal, was obtained.

After compounding, the composition was poured out into thin layers 1 mm. in thickness. After 20 minutes, gelling started. After 1.5 hours of curing at a temperature of 20° C., the composition was polymerized to such an extent that it could be handled. After curing at the same temperature for 24 hours, completely cured layers were obtained which remained colorless and tack-free.

While specific examples of preferred methods and products embodying the present invention have been described above, it will be apparent that many changes and modifications may be made in the details of the methods of procedure and products without departing from the true spirit of the invention. It will therefore be understood that the particular methods and products set forth above are intended to be illustrative only, and are not intended to limit the scope of the invention which is defined by the following claims:

What is claimed is:

1. A process for the peroxidic curing of a monomerpolymer syrupy solution containing a polymer of methylmethacrylate or a copolymer of methylmethacrylate with up to 20% by weight of another lower alkylmethacrylate which comprises curing the solution at a temperature in the range of 0° to 60° C. after compounding with a curing system comprising:

(1) a free-radical-generating organic peroxide;
(2) a vanadium accelerator; and
(3) an aliphatic aldehyde containing 1–18 carbon atoms in the molecule;

all components of the curing system being soluble in the monomeric lower alkylmethacrylate, the free-radical generating organic peroxide being present in an amount sufficient to effect curing, the vanadium accelerator and the aliphatic aldehyde being present in an amount in the range of, respectively, 0.0001–0.01% by weight calculated on metal and 1–4% by weight calculated on the total resin solution.

2. A process according to claim 1, in which the aliphatic aldehyde contains 4–8 carbon atoms in the molecule.

3. A process according to claim 1, in which the aliphatic aldehyde is butyraldehyde, iso-butyraldehyde, heptanal, octanal or octadecadienal.

4. A process according to claim 1, in which the accelerator comprises a solution obtained by dissolving a vanadium compound in a liquid aliphatic mono- or diester of phosphoric or phosphorous acid.

5. A process according to claim 4, in which the mono- or diester is selected from the class consisting of methyl, ethyl, propyl, butyl, amyl, hexyl, heptyl and octyl esters.

6. A process according to claim 1, in which the accelerator comprises a solution obtained by dissolving a vanadium compound in a liquid aliphatic or aromatic sulphonic acid.

7. A process according to claim 6, in which the acid is paratoluene-sulphonic acid.

8. A process according to claim 1, in which the vanadium compound is vanadium pentoxide or vanadium pentachloride.

9. A process according to claim 1, in which the free-radical-generating organic peroxide is selected from the class consisting of hydroperoxides, ketone peroxides, diacyl peroxides, peresters and perketals.

References Cited

UNITED STATES PATENTS 2,412,476 12/1946 Semegen.
3,037,004 5/1962 Simone et al. _____ 260—89.5
3,084,068 4/1963 Munn.
3,380,980 4/1968 Calkins.

HARRY WONG, Jr., Primary Examiner

U.S. Cl. X.R.

260—885, 89.5